US00RE40577E

(19) United States
(12) Reissued Patent
Renaud

(10) Patent Number: US RE40,577 E
(45) Date of Reissued Patent: Nov. 25, 2008

(54) FLEXIBLE TUBE HAVING A VARIABLE STIFFNESS BELLOWS

(75) Inventor: Michel C. Renaud, Prangins (CH)

(73) Assignee: E. I. du Pont de Nemours and Company, Wilmington, DE (US)

(21) Appl. No.: 29/231,513
(22) Filed: Apr. 14, 2005

Related U.S. Patent Documents

Reissue of:
(64) Patent No.: Des. 484,953
Issued: Jan. 6, 2004
Appl. No.: 29/162,123
Filed: Jun. 10, 2002

U.S. Applications:
(62) Division of application No. 29/142,253, filed on May 22, 2001, now Pat. No. Des. 460,536, which is a division of application No. 29/125,826, filed on Jun. 30, 2000, now Pat. No. Des. 447,792.
(51) LOC (8) Cl. ..... 23-01
(52) U.S. Cl. ..... D23/266
(58) Field of Classification Search ..... D23/266; 138/118, 121, 173, 177
See application file for complete search history.

(56) References Cited

U.S. PATENT DOCUMENTS

| | | | | |
|---|---|---|---|---|
| 1,547,431 | A | | 7/1925 | Mallory |
| 3,050,087 | A | * | 8/1962 | Caplan ..... 138/121 |
| D221,078 | S | * | 7/1971 | Seckel et al. ..... D23/266 |
| 3,842,865 | A | | 10/1974 | Torricelli |
| 5,050,087 | A | | 9/1991 | Walrath et al. |
| 6,056,018 | A | | 5/2000 | Renaud |
| D447,792 | S | | 9/2001 | Renaud |

* cited by examiner

*Primary Examiner*—Robin V Webster

(57) CLAIM

The ornamental design for a flexible tube having a variable stiffness bellows, as shown and described.

DESCRIPTION

FIG. 1 is a perspective view of a flexible tube having a stiffness bellows showing my new design;
FIG. 2 is a front view thereof;
FIG. 3 is a side elevational view thereof; and,
FIG. 4 is a sectional view taken along line 4—4 in FIG. 3.

The invention is illustrated in FIG. 1 where there is shown a flexible tube that includes a bellows having a plurality of convolutes formed therein spaced at an interval from each other in the axial direction of flexible tube. The convolutes are raised circumferential ridges formed in the surface of the tube as an integral part thereof, have bending sections that are approximately the same height above the outer surface of the tube and restrained elongation sections that are approximately the same height above the outer surface of the tube with the bending sections having a height above the outer surface of the tube greater than the height of the restrained elongation sections above the outer surface of tube.

In FIG. 2, there is shown another embodiment of the invention which is similar to that shown in FIG. 1, except that the shape of the convolutes has been modified such that near the surface of the tube the convolutes are narrower in the area of the higher restrained elongation sections of the convolutes than in the area of the lower bending sections of the convolutes, with the width of the convolutes being tapered moving from the bending sections to the restrained elongation sections.

Another embodiment of the invention is shown in FIG. 3, where there is shown a flexible tube as in FIG. 1, where the restrained elongation sections include two radially-spaced ridges which are attached at both ends to the bending sections of the convolutes.

FIG. 4 show a flexible tube of the invention similar to that of FIGS. 3 except that the ridges formed in the convolute are tapered.

1 Claim, 1 Drawing Sheet

Figure 4:
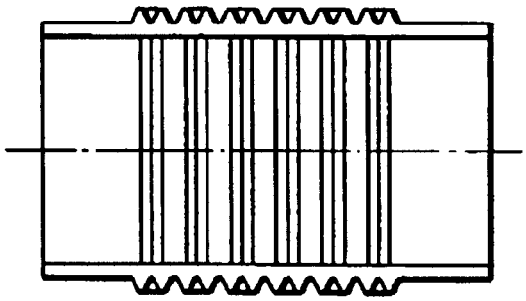

Matter enclosed in heavy brackets [ ] appears in the original patent, but forms no part of this reissue; matter printed in italics indicates the additions made by reissue.

(Amended)

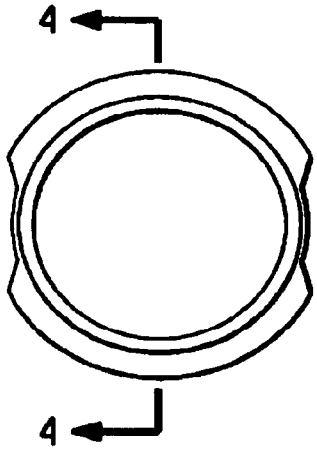

FIG. 1
(Amended)
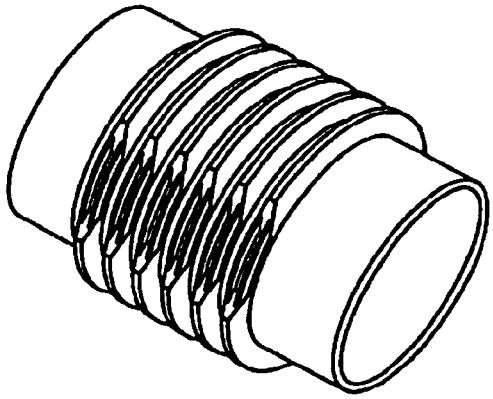
FIG. 2
(Amended)
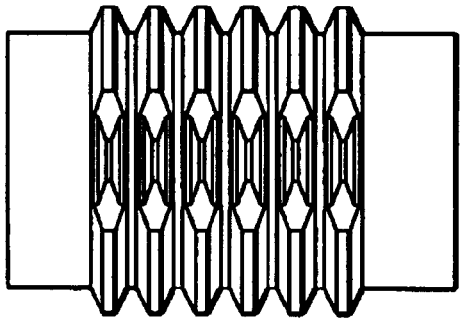
FIG. 3
(Amended)